United States Patent [19]

Kelley

[11] Patent Number: 4,463,150

[45] Date of Patent: Jul. 31, 1984

[54] ACRYLIC OR METHACRYLIC TERMINATED OLIGOMERS

[75] Inventor: Everett J. Kelley, Moorestown, N.J.

[73] Assignee: Rohm and Haas Company, Philadelphia, Pa.

[21] Appl. No.: 373,372

[22] Filed: Apr. 30, 1982

[51] Int. Cl.³ ............................................. C08F 120/20
[52] U.S. Cl. .................................. 526/292.4; 526/309; 526/318; 526/320
[58] Field of Search ..................... 526/292.4, 309, 318, 526/320

[56] References Cited

U.S. PATENT DOCUMENTS

| | | | |
|---|---|---|---|
| 3,150,118 | 9/1964 | Clemens | 526/318 |
| 3,297,658 | 1/1967 | Lee | 526/292.4 |
| 3,427,291 | 2/1969 | Vasta | 526/320 |
| 3,632,861 | 1/1972 | Hargis | 526/318 |
| 3,754,054 | 8/1973 | Kimura et al. | 526/318 |
| 3,790,533 | 2/1974 | Samour | 526/309 |
| 4,107,156 | 8/1978 | Sunamori et al. | 526/320 |

*Primary Examiner*—Harry Wong, Jr.
*Attorney, Agent, or Firm*—Marc S. Adler

[57] ABSTRACT

Acrylic or methacrylic terminated unsaturated maleate or fumarate oligomers are disclosed. The oligomers can be reacted with other ethylenically unsaturated compounds through the acrylate, methacrylate, or maleate/fumarate functionality, they can also be reacted with amines through Michael addition to the acrylic or maleate unsaturation with or without a post reaction through the methacrylate functionality.

2 Claims, No Drawings

ACRYLIC OR METHACRYLIC TERMINATED OLIGOMERS

BACKGROUND OF THE INVENTION

1. Field of the Invention

This invention relates to acrylic and methacrylic terminated maleate/fumarate oligomers which are especially useful as thermosetting resins which are cross-linked with amines.

2. Description of Prior Art

Japanese patent application KO No. 73-32818 of Ito et al of Toa Gosei Chemical Industry Co. Ltd. discloses the reaction product of an alpha, beta-unsaturated carboxylic acid/polybasic acid anhydride/epoxy compound in the mol. ratio of 1:0.5–1.0:1–20 to produce esters having acryloxy group or methacryloxy group as the terminal group on one end of the molecule and hydroxyl group or carboxylic acid on the other end. Compounds having at least two maleic unsaturation sites per acrylic or methacrylic unsaturation site are not disclosed.

Japanese Pat. No. 71-18,965 appears to be cumulative to the above-referenced Japanese patent publication. In Example 1 of this patent, the reaction product of acrylic acid, maleic anhydride, and ethylene oxide in a molar ratio of 1:1:2 is disclosed.

Ilenda, U.S. Pat. No. 4,180,632, shows polymers of acrylic acid monomers having an average acrylate functionality of at least 2.5 reacted with low molecular weight aliphatic amines to form polyamino esters. The Ilenda system is used for Reaction Injection Molding (RIM). RIM processes are described in *Introduction to Reaction Injection Molding*, F. Melvin Sweeney (Techomic, 1979).

SUMMARY OF THE INVENTION

It is an object of the present invention to provide new acrylate and methacrylate functional compounds which are especially useful for reaction with amines in a RIM system.

Another object is to provide very versatile methacrylate functional oligomers which can be reacted through a maleate functionality while leaving the methacrylate functionality unchanged.

A further object is to provide soluble postreactive prepolymers or insoluble postcurable thermosetting resins of improved properties.

A still further object is to provide novel resins for coatings, textile printing and dyeing, casting, polymeric modifiers, elastomeric compounds, sealants, adhesives, and the like.

These objects, and others which will become apparent from the following disclosure, are achieved by the present invention which comprises compositions comprising a compound of the formula

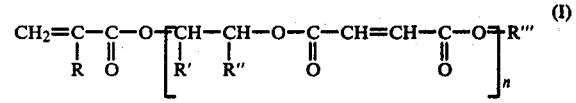
(I)

wherein n is greater than or equal to 2;
R = —H, —CH$_3$, —C$_2$H$_5$;
R', R" = —H, —CH$_3$, —C$_2$H$_5$, —CH$_2$Cl, —CH$_2$—Br, —C$_6$H$_5$, —CH$_2$OCOCH=CH$_2$, —CH$_2$OCOC(CH$_3$)=CH$_2$, —CH$_2$OCH$_2$CH=CH$_2$, —CH$_2$OC$_6$H$_5$, or —CH$_2$OC$_4$H$_9$, or R' pus R" form a cyclic ring —C$_4$H$_8$—; and
R''' = —H, —CHR'—CHR"—OH or —C$_2$H$_4$OH.

In another aspect the invention comprises preparing compounds of formula I comprising reacting a compound of the formula

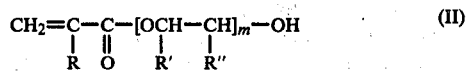
(II)

wherein R, R', and R" are as previously defined and m = 0 or 1, with maleic anhydride, an epoxide, and a catalyst in mole ratios of at least 2 moles of maleic anhydride and, depending on the nature of m and R''', at least 1 to 3 moles epoxide per mole of initiator.

DETAILED DESCRIPTION OF THE INVENTION AND THE PREFERRED EMBODIMENTS

The oligomers of formula I are prepared, preferably, by reacting a compound of formula II with maleic anhydride and an epoxy compound such as ethylene oxide in mole ratios of 2 to 4 moles maleic anhydride and 1 to 5 moles, preferably 3 to 5, epoxy compound per mole of a compound depending on whether the compound is the acid or hydroxyethyl ester and on whether the terminal group on the other end of the molecule is to be acid or ester.

The compound, which provides the (meth)acrylate functionality to the resultant oligomers, can be acrylic acid, methacrylic acid, or 2-hydroxyalkyl methacrylate such as hydroxyethyl methacrylate (HEMA) with the latter being preferred.

A wide variety of catalysts can be employed, usually about 0.1 to 2.0%, with the preferred catalyst being quaternary ammonium salts, calcium, magnesium and lithium halides, and tertiary amines. Specific examples of suitable catalysts are tetramethylammonium bromide, tetramethylammonium chloride, tetramethylammonium methyl sulfate, lithium chloride or bromide. The preferred catalysts promote the reaction between anhydride and epoxide with little or no homopolymerization of the epoxide.

The unsaturated acrylate or methacrylate monomer can be acrylic acid, methacrylic acid, 2-hydroxyalkyl acrylate, or 2-hydroxyethyl methacrylate. Other monomers can be substituted in part or completely for the acrylic or methacrylic monomer; for example, crotonic, itaconic, citraconic, alpha-methylene glutaric acid, and the like.

A minor amount of the maleic anhydride can be replaced by other carboxylic acid anhydrides such as phthalic, succinic, tetrahydrophthalic, hexahydrophthalic, itaconic, mellitic, and the like.

Epoxides which can be used are ethylene, propylene, butylene, isobutylene and styrene oxides, epichlorohydrin, glycidyl acrylate or methacrylate, epibromohydrin, allyl glycidyl ether, phenylglycidyl ester, butyl glycidyl ether, cyclohexene oxide, or mixtures of such epoxides.

The aforementioned molar ratios are an important feature of the present invention because of the intended utility as reactants with polyamines in the RIM process to produce thermosetting resins. At least two and preferably three or more maleate functional groups are required for reaction with polyamines for this purpose.

Some maleate can be isomerized to fumarate as long as at least 2 maleates per molecule remain.

The alkylene oxide mole ratio is kept near the available carboxylic acid ratio or one mole deficit depending on whether the ester or acid terminal group is desired.

The reaction is conducted at a temperature of about 50° to 120° C. and more preferably 70° to 105° C., by introducing the raw materials all at once or preferably by adding the acid or hydroxyalkyl ester of the acid compound to the molten maleic anhydride and any other anhydride, and then adding the epoxy compound at a controlled rate to complete the polymerization.

The reaction can be conducted in the absence or the presence of a solvent such as benzene, toluene, and the like.

Polymerization inhibitors such as hydroquinone, hydroquinone monomethyl ether, phenothiazine, copper powder, and the like can be employed.

The oligomers of the invention can be reacted with polyamines to form thermosetting resins. If the initiating acid is methacrylic, such functionality is very slow to react with amine and is available for a facilitated postcure reaction with normal peroxide free radical initiation. In addition, methacrylic (or acrylic) functionality greatly increases the possibility for copolymerization with a much wider range of comonomers than does residual maleate functionality.

Certain of the oligomers of the invention, especially methacrylic terminal groups, react with certain diamines to give soluble noncrosslinked polymers. Such materials are reactive prepolymers capable of further incorporation in acrylic polymer systems.

A third option is reaction of these maleate oligomers with monoamines to readily form a class of polymerizable polyamines.

The following non-limiting examples are presented to illustrate a few embodiments of the invention.

EXAMPLE 1

To molten maleic anhydride (196 parts) containing p-methoxyphenol (0.17 parts) was added with stirring at 60°-80° C., 2-hydroxyethyl methacrylate (130 parts) in 3 aliquots over a period of 1.5 hours. The mixture was heated an additional 2 hours at 80° C. and swept with $N_2$. Ethylene oxide (97 parts) was then bubbled in with stirring in the presence of tetramethyl ammonium bromide (0.83 parts) catalyst over a 7-hour period at 85°-95° C. and a maximum pressure of 10 psig. The batch was vacuum stripped at 50°-60° C. and 30 mm Hg pressure. The stripped residue amounted to 428 grams (calc. 414) for a conversion of 103%. Residual acidity 11.2 A.N. The product was an amber color liquid with a viscosity (neat) of 880 cps. at 25° C. Unsaturation by Br. No. was 93% of theory (108 ctg/gm.—calc. 115.8). The maleate/fumarate ratios have shown 90% maleate functionality. The product was essentially

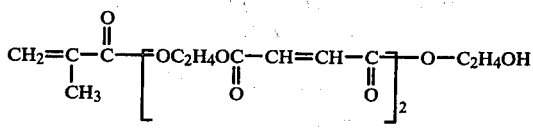

EXAMPLE 2

Following the procedure of Ex. 1,

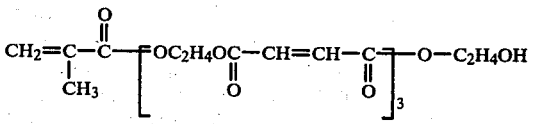

was prepared from maleic anhydride (294 parts), p-methoxyphenol (0.22 parts), 2-hydroxyethyl methacrylate (130 parts), tetramethylammonium bromide (1.11 parts), and ethylene oxide (153 parts) in an 11-hour reaction period at 95°-100° C. The final acidity was A.N. 0.4, and conversion was 102%. An 80% solution in styrene showed a viscosity of 200 cps. at 25° C.

EXAMPLE 3

The acid terminated monomer

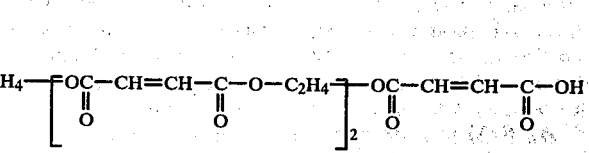

was prepared by heating the product of Example 1 (103.5 parts) with maleic anhydride (24.5 parts) with stirring at 100° C. for 4 hours in the presence of p-methoxyphenol (0.05 parts). Acid No. found 102.7; calc. 100.6 for this particular ratio of reactants.

EXAMPLE 4

Methacrylate terminated polyethylene maleate as prepared in Example 2 was mixed with 0.2% by weight of free radical initiator di-tert-butyl peroxide. The mixture was heated to 80° C. for 0.5 hour, 110° C. for 0.5 hour, 140° C. for 0.5 hour, and 170° C. for 1 hour to produce a hard, clear, amber polymer.

EXAMPLE 5

Following the procedure of Example 1,

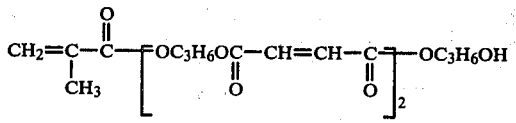

is prepared from 196 parts maleic anhydride, 144 parts hydroxypropyl methacrylate, and 128 parts propylene oxide.

EXAMPLE 6

A mixture of 265 parts molten maleic anhydride, 30 parts succinic anhydride, and 86 parts crotonic acid is swept with nitrogen. Gradually 193 parts ethylene oxide are added in the presence of 1.7 parts tetramethyl ammonium chloride and 0.29 parts p-methoxyphenol over a 12 hour period at 85°–100° C. and a maximum pressure of 20 psig. to form

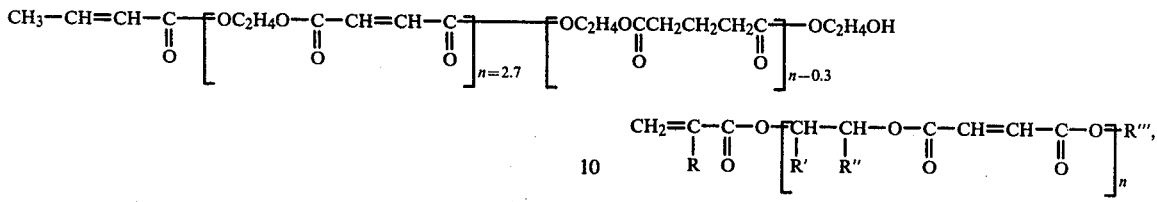

EXAMPLE 7

Following the procedure of Example 1,

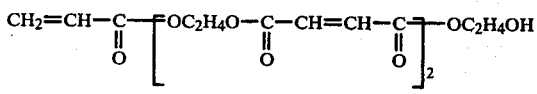

is prepared from 196 parts maleic anhydride, 116 parts of 2-hydroxyethyl acrylate, and 97 parts ethylene oxide in the presence of 0.83 parts tetramethyl ammonium bromide, 0.20 parts p-methoxyphenol, and 0.20 parts quinone.

EXAMPLE 8

Methacrylate terminated polyethylene maleate (wherein n=2 R=—CH$_3$,R' and R''=—H, and R'''=—C$_2$H$_4$OH) (40 parts) was mixed with styrene (10 parts) containing ditert-butyl peroxide (0.1 part) and benzoyl peroxide (0.08 parts). The mixture was heated to 80° C. for 1.5 hours, 140° C.–1.5 hours, and 170° C.–1.5 hours to form a hard, clear, pale amber colored polymer.

What is claimed is:

1. A polymer formed by the free radical initiated reaction of an oligomer comprising the formula (I)

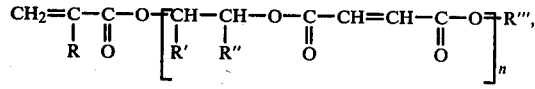

wherein n is greater than or equal to 2;
R=—H, —CH$_3$, or —C$_2$H$_5$;
R', R''=—H, —CH$_3$, —C$_2$H$_5$, —CH$_2$Cl, —CH$_2$Br, —C$_6$H$_5$, —CH$_2$OCOCH=CH$_2$, —CH$_2$OCOC(CH$_3$)=CH$_2$, —CH$_2$OCH$_2$CH=CH$_2$, —CH$_2$OC$_6$H$_5$, or —CH$_2$OC$_4$H$_9$, or R' plus R'' form a cyclic ring —C$_4$H$_8$—; and
R'''=—H or —C$_2$H$_4$OH.

2. A copolymer formed by the free radical initiated reaction of an oligomer comprising the formula (I)

$$CH_2=C-C-O+CH-CH-O-C-CH=CH-C-O\!\!\!-\!\!\!R''',$$
$$\phantom{CH_2=}\,R\ \ O\ \ \ \ \ R'\ \ R''\ \ \ O\ \ \ \ \ \ \ \ \ \ \ O\ \ ]_n$$

wherein n is greater than or equal to 2;
R=—H, —CH$_3$, or —C$_2$H$_5$;
R', R''=—H, —CH$_3$, —C$_2$H$_5$, —CH$_2$Cl, —CH$_2$Br, —C$_6$H$_5$, —CH$_2$OCOCH=CH$_2$, —CH$_2$OCOC(CH$_3$)=CH$_2$, —CH$_2$OCH$_2$CH=CH$_2$, —CH$_2$OC$_6$H$_5$, or —CH$_2$OC$_4$H$_9$, or R' plus R'' form a cyclic ring —C$_4$H$_8$—; and
R'''=—H or —C$_2$H$_4$OH; and at least one other ethylenically unsaturated monomer.

* * * * *